United States Patent [19]

Tano et al.

[11] 4,324,462
[45] Apr. 13, 1982

[54] EXPOSURE TIME CONTROL CIRCUIT FOR CAMERA

[75] Inventors: Eiichi Tano, Kamifukuoka; Koji Suzuki, Asaka, both of Japan

[73] Assignee: Asahi Kogaku Kogyo Kabushiki Kaisha, Tokyo, Japan

[21] Appl. No.: 202,858

[22] Filed: Oct. 31, 1980

[30] Foreign Application Priority Data

Nov. 13, 1979 [JP] Japan ................................ 54-146953

[51] Int. Cl.³ .............................................. G03B 7/08
[52] U.S. Cl. .................................. 354/23 D; 354/33; 354/60 F
[58] Field of Search ...................... 354/23 D, 33, 60 F

[56] References Cited

U.S. PATENT DOCUMENTS

| | | | |
|---|---|---|---|
| 4,084,166 | 4/1978 | Kawasaki et al. | 354/23 D |
| 4,092,653 | 5/1978 | Kawasaki et al. | 354/23 D |
| 4,112,439 | 9/1978 | Kawasaki et al. | 354/23 D |
| 4,156,562 | 5/1979 | Kawasaki et al. | 354/23 D |
| 4,225,218 | 9/1980 | Nomata | 354/23 D |

Primary Examiner—Russell E. Adams
Attorney, Agent, or Firm—Sughrue, Mion, Zinn, Macpeak and Seas

[57] ABSTRACT

A circuit for controlling an exposure time of a camera which operates depending on whether or not an electronic flash used with the camera is charged and ready for operation. An arithmetic operation circuit operates upon signals representing object brightness, film sensitivity, and aperture value and exposure factor compression values to calculate an automatic exposure time. The output of the arithmetic operation circuit is multiplexed with the output of a manual exposure time setting circuit to an expansion time determination circuit. The manual exposure time setting device output is multiplexed through a first gating means with the output of a counter which operates in response to an oscillator. Multiplexed outputs are coupled to an input port of a digital-to-analog converter the output of which is coupled to one input of an analog-to-digital converter and the other input of which is coupled to the output of the arithmetic operation circuit. The output of the analog-to-digital converter is multiplexed with the output of the first gating means to operate a display device.

9 Claims, 6 Drawing Figures

EXPOSURE TIME CONTROL CIRCUIT FOR CAMERA

BACKGROUND OF THE INVENTION

Conventional cameras are disadvantageous in that, when shifting the photographing mode from an automatic or manual photographing mode to a flash photographing mode, if the automatic exposure time or a manually set exposure time is shorter than a minimum time needed to synchronize the flash, the photographer must manually operate the shutter speed dial to reset it to an acceptable speed. Further, when the flash photographing mode is shifted back to the automatic or manual photographing mode, the shutter speed dial has to be reset. This imposes a burden on the photographer, and if the photographer forgets to reset the shutter speed dial, an appropriate exposure cannot be obtained.

An object of the invention is thus to eliminate the above-described drawbacks accompanying conventional cameras.

SUMMARY OF THE INVENTION

The invention provides an exposure time control circuit for a camera which includes an arithmetic circuit which receives signals representative of object brightness, film sensitivity, aperture value and exposure factor logarithmic compression values and which in response thereto calculates an automatic exposure time; a manual exposure time setting circuit for calculating digital data corresponding to a manually set exposure time; a detection circuit for detecting when an electronic flash is ready for operation; an automatic-manual change-over circuit for switching between an automatic exposure time control mode and a manual exposure time control mode; a first gate circuit for subjecting the output of the manual exposure time setting circuit and the output of the detection circuit to a logic operation; a second gate circuit for subjecting the output of the automatic-manual change-over circuit and the output of the detection circuit to a logic operation; a digital-to-analog conversion circuit for converting the output of the first gate circuit to an analog signal; and an expansion time determination circuit for performing exposure time determination in response to the output of the arithmetic circuit or digital-to-analog conversion circuit and in response to the output of the second gate circuit.

In accordance with a specific feature of the invention, with an electronic flash operating in association with a camera provided with the above-described exposure time control circuit, when the detection circuit has detected the fact that the flash is ready for operation, specifically that the main storage capacitor is charged up, exposure time control is carried out wherein a manual exposure time control system is automatically set irrespective of whether the camera is operated in the automatic or manual exposure time control mode while an exposure time is determined by the expansion time determination circuit according to digital data which is obtained by logic operations upon the output of the manual exposure time setting circuit. If the completion of charging has not been detected by the detection circuit, whether the flash is mounted on the camera or not, exposure time control is determined by the automatic-manual change-over circuit. That is, an exposure time is determined by the expansion time determination circuit according to the output of the arithmetic circuit or the output of the manual exposure time setting circuit.

DESCRIPTION OF THE PREFERRED EMBODIMENTS

A preferred embodiment of an exposure time control circuit constructed according to the invention will be described with reference to the accompanying drawings.

Figure 1:
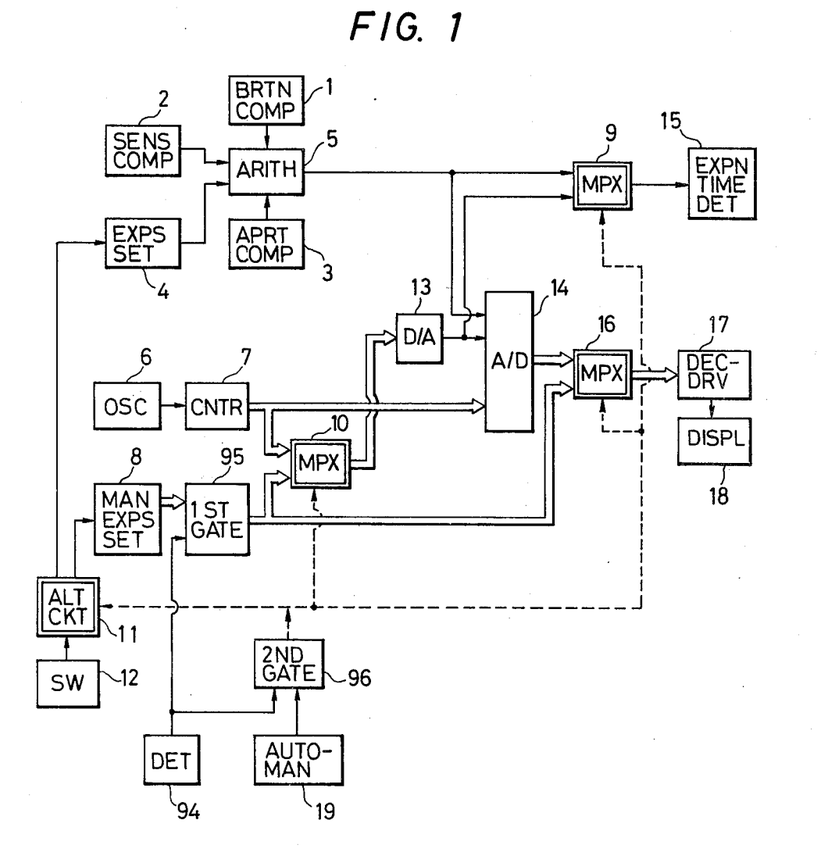
FIG. 1 is a block diagram showing a preferred embodiment of an exposure time control circuit constructed according to the invention.

The exposure time control circuit of the preferred embodiment, as shown in FIG. 1, includes an object brightness compression circuit 1 for determining an object brightness APEX value Bv, a film sensitivity compression circuit 2 for producing a film sensitivity APEX value Sv, an aperture value compression circuit 3 for determining an aperture APEX value Av, and an exposure factor setting circuit 4 for calculating the logarithmic compression value of an exposure factor which is expressed by $Xv = \log_2 X$ where Xv is the APEX equivalent value and X is the exposure factor. The outputs of the circuits 1 through 4 are applied to an arithmetic circuit 5. An oscillator circuit 6 for generating a clock pulse is connected to a counter 7 which provides a count in response to clock pulses produced by the oscillator. The output signal from a switch circuit 12 is applied through an alternation circuit 11 to a manual exposure time setting circuit 8 which is implemented by a counter. The output of the manual exposure time setting circuit 8 and the output of a detection circuit 94, which is adapted to detect the completion of the charging of an electronic flash, are applied to a gate circuit 95. The outputs of the counter 7 and of the gate circuit 95 are applied to a multiplexer circuit 10. The output of the multiplexer circuit 10 is applied to a D/A (digital-to-analog) converter circuit 13 the output of which is supplied to an A/D (analog-to-digital) converter and latch circuit 14 to which the outputs of the arithmetic circuit 5 and the counter 7 are also applied. The outputs of the D/A converter circuit 13 and the arithmetic circuit 5 are applied to a multiplexer circuit 9 the output of which is supplied to an expansion time determination circuit 15.

The outputs of the A/D converter and latch circuit 14 and the gate circuit 95 are supplied to a multiplexer circuit 16 the output of which is applied through a decoder and driver circuit 17 to a display element device 18 to drive the latter. The output signal from the switch circuit 12 is applied through the alternation circuit 11 to the exposure factor setting circuit 4. The output of an automatic-manual change-over circuit 19 passes through a gate circuit 96, the operation of which is controlled by the output of the detection circuit 94, and is then applied to the multiplexer circuits 9, 10 and 16 and the alternation circuit 11. As a result, if the completion of charging of the electronic flash has not been detected by the detection circuit 94 and the automatic-manual change-over circuit 19 is set to "automatic", the output of the gate circuit 96 is at a logical low or "0" level and the multiplexer circuits 9, 10 and 16 and the alternation circuit 11 operate to connect the output of the arithmetic circuit 5 to the expansion time determination circuit 15, the output of counter 7 to the D/A converter circuit 13, the output of the switch circuit 12 to the exposure factor setting circuit 4, and the output of the A/D converter and latch circuit 14 to the decoder and driver circuit 17, respectively. If, on the other hand, the completion of charging of the electronic flash has been detected by the detection circuit 94 or the completion of charging has not been detected but the automatic-manual change-over circuit 19 is set to "manual", the output of the gate circuit 96 is at a logical high or "1" level and the multiplexer circuits 9, 10 and 16 and the alternation circuit 11 operate to connect the output of the D/A converter circuit 13 to the expansion time determination circuit 15, the output of the gate circuit 95 to the D/A converter circuit 13, the output of the switch circuit 12 to the manual exposure time setting circuit 8, and the output of the manual exposure time setting circuit 8 to the decoder and drive circuit 17, respectively.

The operation of the exposure time control circuit thus constructed will now be described. First the case will be described where the electronic flash is not mounted on the camera or the electronic flash is mounted on the camera but has not fully charged, that is, the completion of charging has not been detected by the detection circuit 94 so that the outputs of the manual exposure time setting circuit 8 and the automatic-manual change-over circuit 19 are applied to the following stages.

For automatic exposure time control, the following calculation (1) is carried out by the arithmetic circuit 5:

$$Sv+Bv-Av-Xv \tag{1}$$

In the APEX equation, the following equation is established with the condition that exposure factor is also taken into account:

$$Sv+Bv-Xv=Av+Tv \tag{2}$$

where Tv is the exposure time APEX value. As is clear from equations (1) and (2), a compression voltage corresponding to a Tv value which corresponds to an automatically controlled exposure time is applied from the output of the arithmetic circuit 5 through the multiplexer circuit 9 to the expansion time determination circuit 15. In this case, the shutter speed is controlled in a conventional manner as to obtain a correctly exposed picture.

The outputs of the arithmetic circuit 5, the counter 7 and the D/A converter circuit 13 are supplied to the A/D converter and latch circuit 14 to thus subject the output of the arithmetic circuit 5 to A/D conversion and latching. The A/D converter and latch circuit may be a circuit disclosed for instance by Japanese Laid-Open Patent Application No. 56924/1977. The output of the A/D converter and latch circuit 14 is then applied through the multiplexer circuit 16 to the decoder and driver circuit 17 so that the automatic exposure time is displayed by the display element unit 18. As the output signal of the switch circuit 12 is applied through the alternation circuit 11 to the exposure factor setting circuit 4, the switch circuit 12 operates as an exposure factor setting device for the automatic exposure time control mode.

The operation in the manual exposure time control mode will be described. The output signal of the switch 12 is inputted through the alternation circuit 11 to the manual exposure time setting circuit 8 so that digital data corresponding to an exposure time set is provided thereto. The output of the manual exposure time setting circuit 8 is introduced through the multiplexer circuit 10 to the A/D converter circuit 13. The digital data inputted to the D/A converter circuit 13 is subjected to analog-to-digital conversion and is then applied through the multiplexer circuit 9 to the expansion time determination circuit 15 so that the exposure time set by the switch circuit 12 is determined. As the completion of the changing of the electronic flash is not detected by the detection circuit 94, the output of the manual exposure time setting circuit 8 is applied directly through the multiplexer circuit 16 to the decoder and driver circuit 17 so that the manual exposure time is displayed by the display element unit 18.

As described above, the switch circuit 12 operates as an exposure factor setting device for the automatic exposure time control mode and as the manual exposure time setting device for the manual exposure time control mode. The display element unit 18 operates to display the exposure time for both the automatic and manual exposure time control modes.

Now, the operation in the case where the electronic flash has been fully charged and is ready for operation will be described. The output of the automatic-manual change-over circuit 19 is applied to the gate circuit 96 and the output of the gate circuit 96 applies a "manual" signal to the multiplexer circuits 9, 10, and 16 and the alternation circuit 11 irrespective of the output of the automatic-manual change-over circuit 19 as described above. Similarly, the output of the manual exposure time setting circuit is applied to the gate circuit 95 where it is subjected to a logic conversion operation. Thus, irrespective of the output of the manual exposure time setting circuit 8, the output of the gate circuit 95 causes digital data corresponding to a synchronized-speed exposure time to be applied to the multiplexer circuits 10 and 16. Therefore, immediately upon the electronic flash becoming ready for operation, a manual photographing mode is established and the exposure time is automatically set to a synchronized-speed exposure time.

Figure 2:
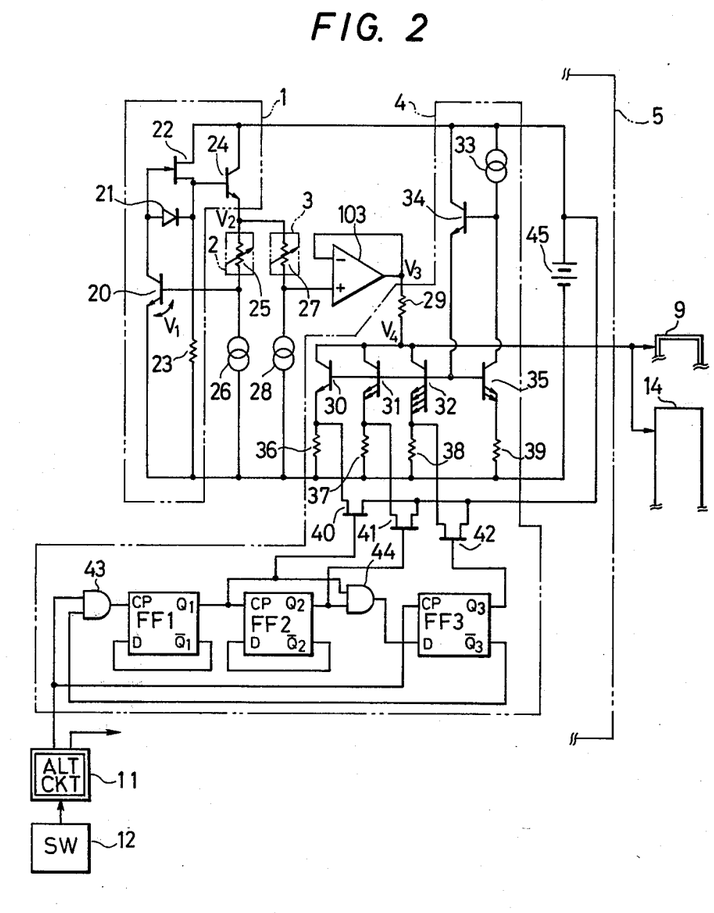
FIG. 2 is a circuit diagram, partly as a block diagram, showing specific examples of a brightness compression circuit, a film sensitivity compression circuit, an aperture value compression circuit, an exposure factor setting circuit and an arithmetic circuit used in the circuit of FIG. 1.

FIG. 2 shows a specific example of the above-described brightness compression circuit 1, film sensitivity compression circuit 2, aperture valve compression circuit 3, exposure factor setting circuit 4, and arithmetic circuit 5. The collector of a logarithmic compression transistor 20 is connected to the gate of a field-effect transistor (FET) 22 which is self-biased through a light receiving element 21 and a resistor 23. The source of the FET 22 is connected to the base of a transistor 24 which forms an emitter follower with an Sv variable resistor 25 the resistance of which is set to a film sensitivity APEX value Sv and a constant current source 26 and with an Av variable resistor 27 the resistance of which set to an aperture APEX value Av and a constant current source 28. The connecting point of the Sv variable resistor 25 and the constant current source 26 is connected to the base of the logarithmic compression transistor 20. The connecting point of the Av variable resistor 27 and the constant current source 28 is connected to the non-inverting input terminal of an operational amplifier 103 operated as a voltage follower. The emitter areas of transistors 30, 31 and 32 are preselected to be in the ratio of 1:2:4. The collectors of the transistors 30, 31 and 32 are connected through a common resistor 29 to the output terminal of the amplifier 103. Resistors 36, 37 and 38 and the sources of FET's 40, 41 and 42 are connected to the emitters of the transistors 30, 31 and 32, respectively. The gates of the FET's 40, 41 and 42 are connected to the outputs $Q_1$, $Q_2$ and $Q_3$ of flip-flop circuits FF1, FF2 and FF3, respectively, and the drains are commonly connected to a power source 45. The output of a constant current source 33 is applied to the collector of a transistor 35. Current from the collector of the transistor 35 is fed back to the base thereof through a transistor 34. The emitter of the transistor 35 is connected through a resistor 39 to the negative terminal of the power supply 45.

AND gates 43 and 44 and the flip-flop circuits FF1, FF2 and FF3 form a three-bit quinary counter which counts from binary zero to binary four then recycles. When a pulse signal is applied to the quinary counter by the multiplexer circuit 11, logical levels are successively provided at the outputs $Q_1$, $Q_2$ and $Q_3$ as indicated in Table 1 below:

TABLE 1

| $Q_3$ | $Q_2$ | $Q_1$ |
|---|---|---|
| 0 | 0 | 0 |
| 0 | 0 | 1 |
| 0 | 1 | 0 |
| 0 | 1 | 1 |
| 1 | 0 | 0 |

In operation, current from the collector of the transistor 20, which is driven by a constant current from the photocurrent $i_p$ of the light receiving element 21, is fed back to the base thereof through the FET 22, the transistor 24 and the Sv variable resistor 25. The base-emitter voltage $V_1$ of the transistor 20 is:

$$V_1 = \frac{KT}{q} \ln \frac{i_p}{i_0} + V_0 \quad (3)$$

where K is Boltzmann's constant, T is the absolute temperature, q is the electron charge, and $V_0$ is the base-emitter voltage with a collector current $i_0$. The emitter potential $V_2$ of the transistor 24 can be represented by the following equation (4):

$$V_2 = V_1 + i_{26} \cdot R_{25} \quad (4)$$

where $i_{26}$ is the current of the constant current source 26 and $R_{25}$ is the resistance of the Sv variable resistor 25. The output voltage $V_3$ of the operational amplifier 103 is:

$$V_3 = V_2 - i_{28} \cdot R_{27} \quad (5)$$

where $R_{27}$ is the resistance of the Av variable resistor 27 and $i_{28}$ is the current of the constant current source 28. The FET's 40, 41 and 42 are controlled by the outputs $Q_1$, $Q_2$ and $Q_3$ of the flip-flop circuits FF1, FF2 and FF3, respectively, in such a manner that the FET's are rendered non-conductive when "0" signals are applied to their gates and the FET's are rendered conductive when "1" signals are applied to their gates. The emitters of the transistors 30, 31 and 32 are connected to the sources of the FET's 40, 41 and 42, respectively. Accordingly, the on-off states of the transistors 30, 31 and 32 are opposite to the on-off states of the FET's 40, 41 and 42, respectively.

If the current of the constant current source 33 is represented by $i_{33}$ and the resistances of the resistors 36, 37, 38 and 39 are in the ratio of 4:2:1:2, the currents flowing in the collectors of the transistors 30, 31 and 32 can be expressed by $i_{33}/2$, $i_{33}$ and $2i_{33}$, respectively. Accordingly, if the resistance of the resistor 29 is represented by $R_{29}$, the common collector potential $V_4$ of the transistors 30, 31 and 32 is as indicated in the following Table 2 as determined in response to the switching operations of the FET's 40, 41 and 42 with respect to the above-described Table 1.

TABLE 2

| State (=N) | $Q_3$ | $Q_2$ | $Q_1$ | FET 42 | FET 41 | FET 40 | $V_4$ |
|---|---|---|---|---|---|---|---|
| 0 | 0 | 0 | 0 | off | off | off | |
| 1 | 0 | 0 | 1 | off | off | on | $V_4 = V_3 -$ |
| 2 | 0 | 1 | 0 | off | on | off | $(7 - N) \times \frac{i_{33}}{2} \cdot R_{29}$ |
| 3 | 0 | 1 | 1 | off | on | on | |
| 4 | 1 | 0 | 0 | on | off | off | |

With reference to the equations (3), (4) and (5), the equation (6) can be rewritten as follows:

$$V_4 = \frac{KT}{q} \ln \frac{i_p}{i_0} + V_0 + i_{26} R_{25} - i_{28} R_{27} - \quad (7)$$
$$(7 - N) \times \frac{i_{33}}{2} \cdot R_{29}.$$

In the equation (7), $i_p = i_{p0} 2^{Bv}$ where $i_{p0}$ is the photocurrent when $Bv = 0$. Therefore, $$V_4 = Bv \frac{KT}{q} \ln 2 + i_{26} \cdot R_{25} - i_{28} \cdot R_{27} - \quad (8)$$
$$(7 - N) \times \frac{i_{33}}{2} \cdot R_{29} + C$$

where $C = (KT/q)\ln(i_{p0}/i_0) + V_0$. In the equation (8), the first term $Bv(KT/q)\ln 2$ represents a displacement corresponding to an object brightness variation and $(KT/q)\ln 2$ represents an amount of variation per unit step of 1Ev. If the displacement per step of $i_{26} \cdot R_{25}$ is $i_{28} \cdot R_{27}$ is set to $(KT/q)\ln 2$ and $Av(KT/q)\ln 2$, respectively. Therefore, the equation (8) can be rewritten as follows:

$$V_4 = \frac{KT}{q} \ln 2(Bv + Sv - Av) - (7 - N) \times \frac{i_{33}}{2} \cdot R_{29} + C \quad (9)$$

If, in the equation (9), $N = 2 - Xv$ and $(i_{33}/2) \cdot R_{29}$ is set to $(KT/q)\ln 2$, then the equation (9) can be expressed as follows:

$$V_4 = \frac{KT}{q} \ln2(Bv + Sv - Av - Xv) + C' \tag{10}$$

where $C' = C - 5(KT/q)\ln2$. In the equation (10), Xv is defined by the state (N) of the output of the quinary counter. Therefore, if for Xv=0 (N=2), the exposure factor is set to one, then Xv=2, 1, 0, −1 and −2 are obtained respectively for N=0, 1, 2, 3 and 4, and the exposure factor will accordingly be 4, 2, 1, ½ and ¼.

Referring to the equations (2) and (10), the following equation (11) can be obtained:

$$V_4 = Tv \frac{KT}{q} \ln2 + C'. \tag{11}$$

In the equation (11), C' is a constant independent of the object brightness, film sensitivity, camera aperture value, and exposure factor. Exposure time control taking the exposure factor into account is carried out in a known manner by applying the value $V_4$ of the equation (11) to the expansion time determination circuit 15.

Figure 3:
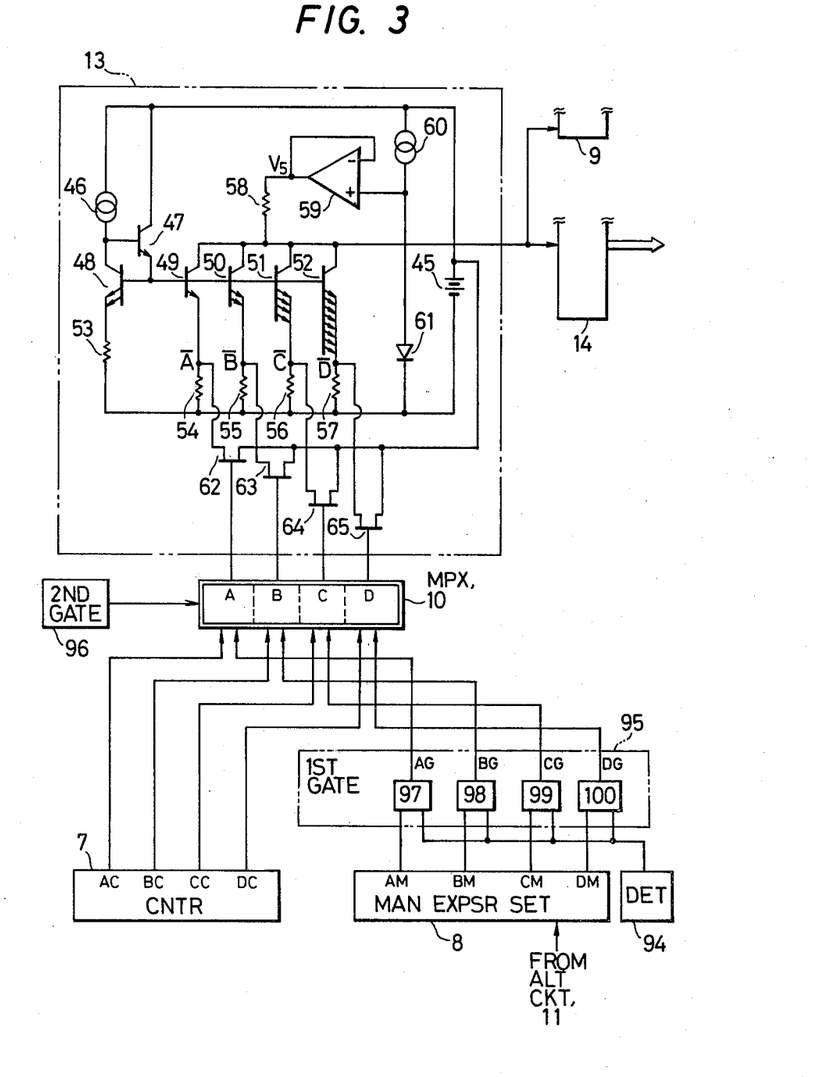
FIG. 3 is a circuit diagram, partly as a block diagram, showing a specific example of a D/A converter circuit used in the circuit of FIG. 1.

FIG. 3 shows a specific example of the D/A converter circuit 13 and the flows of electrical signals in the counter 7, the automatic-manual change-over circuit 8 and the gate circuit 95 which are electrically coupled to the circuit 13.

In FIG. 3, the output of a constant current source 46 is applied to the collector of a transistor 48. Current from the collector of the transistor 48 is fed back to the base of the transistor 48 through a transistor 47. The emitter areas of transistors 49, 50, 51 and 52 are preselected to be in the ratio of 1:2:4:8. The emitters $\overline{A}$, $\overline{B}$, $\overline{C}$ and $\overline{D}$ of the transistors 49, 50, 51 and 52 are connected to resistors 54, 55, 56 and 57 and to the sources of FET's 62, 63, 64 and 65, respectively. The drains of the FET's 62, 63, 64 and 65 are connected to the power source 45 while the gates thereto are connected to the outputs A, B, C and D of the multiplexer circuit 10, respectively. The gates of the FET's 62, 63, 64 and 65 are connected through the multiplexer circuit 10 to the outputs $A_C$, $B_C$, $C_C$ and $D_C$ of the counter 7 having a 4-bit output for automatic exposure time control. The outputs $A_C$, $B_C$, $C_C$ and $D_C$ correspond to the counter output bits at positions $2^0$, $2^1$, $2^2$ and $2^3$, respectively. In the manual exposure time control mode or when the electronic flash has been fully charged, the gates of the FET's 62, 63, 64 and 65 are connected to the outputs $A_G$, $B_G$, $C_G$ and $D_G$ of the gate circuit 95 to which the output of the detection circuit 94 and the outputs $A_M$, $B_M$, $C_M$ and $D_M$ of the manual exposure time setting circuit 8 are applied. $A_G$, $B_G$, $C_G$ and $D_G$ correspond to bits at positions $2^0$, $2^1$, $2^2$ and $2^3$ of the gate circuit 95, respectively, while $A_M$, $B_M$, $C_M$ and $D_M$ correspond to bits at positions $2^0$, $2^1$, $2^2$ and $2^3$, respectively, of the manual exposure time setting circuit 8.

The gate circuit 95 includes two-input logic circuits 97, 98, 99 and 100. The logic circuits are so constructed that, when the electronic flash charge completion has not detected by the detection circuit 94, the output of the manual exposure time setting circuit 8 is coupled to the output of the gate circuit 95 while when the electronic flash charge completion has been detected by the detection circuit 94, the output of the gate circuit 95 is independent of the output of the manual exposure time setting circuit 8.

The output of a constant current source 60 is applied to the anode of a diode 61 which is connected to the non-inverting input terminal of an operational amplifier 59 connected as a voltage follower. The output terminal of the operational amplifier 59 is connected through a common resistor 58 to the collectors of the transistors 49, 50, 51 and 52 which are connected to the multiplexer circuit 9 and the A/D converter circuit 14.

The operation of the circuitry shown in FIG. 3 will be described. If the current of the constant current source 46 is represented by $i_{46}$ and the resistances of the resistors 53, 54, 55, 56 and 57 are set in the ratio of 4:8:4:2:1, then the collector currents of the transistors 49, 50, 51 and 52 can be expressed by ($i_{46}/2$), $i_{46}$, $2i_{46}$ and $4i_{46}$, respectively. If the current of the constant current source 60 is represented by $i_{60}$, then the output voltage $V_5$ of the operational amplifier 59 is:

$$V_5 = \frac{KT}{q} \ln \frac{i_{60}}{i_0} + V_0 \tag{12}$$

where $V_0$ is the forward voltage of the diode 61 with a forward current $i_0$. Accordingly, the operational amplifier 59 functions as a constant current source for generating the voltage $V_5$. If the voltage drop ($i_{46}/2$)×$R_{58}$ (where $R_{58}$ is the resistance of the resistor 58) across the resistor 58 due to the collector current of the transistor 49 is set to be equal to (KT/q)ln2, then the collector voltage $V_6$ of the transistors 49, 50, 51 and 52 will be set as indicated in the following Table 3 as the states of the FET's 62, 63, 64 and 65 are switched by the output A, B, C, D of the multiplexer circuit 10.

TABLE 3

| State (=n) | D | C | B | A | FET 65 | FET 64 | FET 63 | FET 62 | $V_6$ |
|---|---|---|---|---|---|---|---|---|---|
| 0 | 0 | 0 | 0 | 0 | off | off | off | off | |
| 1 | 0 | 0 | 0 | 1 | off | off | off | on | |
| 2 | 0 | 0 | 1 | 0 | off | off | on | off | |
| 3 | 0 | 0 | 1 | 1 | off | off | on | on | |
| 4 | 0 | 1 | 0 | 0 | off | on | off | off | |
| 5 | 0 | 1 | 0 | 1 | off | on | off | on | $V_6 =$ (13) |
| 6 | 0 | 1 | 1 | 0 | off | on | on | off | $V_5 - (15 - n) \times$ |
| 7 | 0 | 1 | 1 | 1 | off | on | on | on | $\frac{KT}{q} \ln2$ |
| 8 | 1 | 0 | 0 | 0 | on | off | off | off | |
| 9 | 1 | 0 | 0 | 1 | on | off | off | on | |
| 10 | 1 | 0 | 1 | 0 | on | off | on | off | |
| 11 | 1 | 0 | 1 | 1 | on | off | on | on | |
| 12 | 1 | 1 | 0 | 0 | on | on | off | off | |
| 13 | 1 | 1 | 0 | 1 | on | on | off | on | |
| 14 | 1 | 1 | 1 | 0 | on | on | on | off | |
| 15 | 1 | 1 | 1 | 1 | on | on | on | on | |

If n=$T_{V\,M}$+4 in the equation (13), then $V_6 = T_{V\,M}(KT/q)\ln2 + C''$ (14), where $C'' = V_5 - 11(KT/q)\ln2$. In the equation (14), C'' is a constant independent of the output of the manual exposure time setting circuit 8. If the flash has been fully charged, the output A, B, C, D of the multiplexer circuit 10 is determined according to the output of the gate circuit 95 which is defined nonambiguously. Therefore the gate circuit 95 is so constructed as to provide a synchronized speed. If $V_6$ is applied to the exposure time determination circuit 15 similar to the case of the equation (11) with $T_{V\,M}$ regarded as a manual exposure time APEX value, then the manual exposure time control is properly carried out. For the manual exposure time control mode or when flash charge completion has been detected by the detection circuit 95, the output $A_G$, $B_G$, $C_G$, $D_G$ of the gate circuit 95 is applied through the multiplexer circuit 16 to the decoder and driver circuit 17. Therefore, the selected manual exposure time or the exposure time which is automatically set in response to the completion of the charging of the flash is displayed by the display element unit 18.

In the automatic exposure time control mode, the 4-bit counter 7 starts its counting operation in response to the output clock pulse signal of the oscillator circuit 6 and the output voltage $V_6$ of the D/A converter circuit 13 is applied in a time-series mode as a stair step waveform having a step voltage $(KT/q)\ln 2$ to the A/D converter and latch circuit 14 to which the output of the arithmetic circuit 5 as indicated by the equation (11) and the output of the 4-bit counter 7 are applied. Therefore, the output voltage of the arithmetic circuit 5 is subjected to analog-to-digital conversion and is latched and then applied to the decoder and driver circuit 17. The automatic exposure time is displayed by the display element unit 18.

Figure 4:
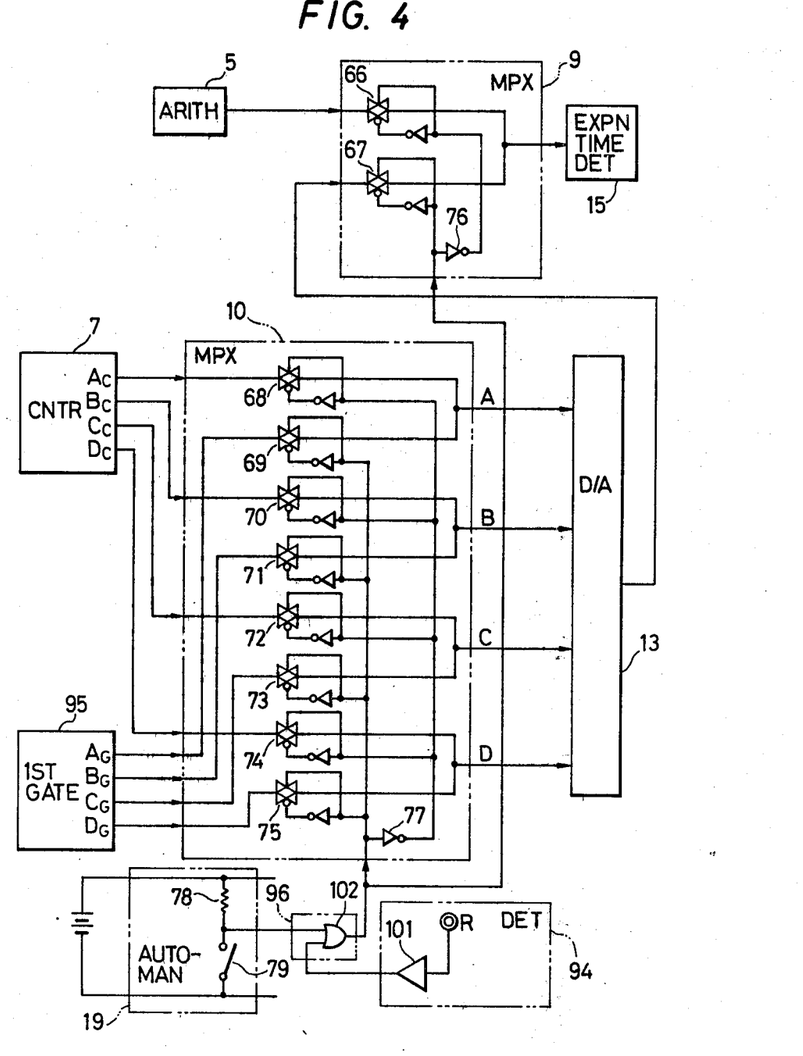
FIG. 4 is a circuit diagram, partly as a block diagram, showing specific examples of multiplexer circuits and an automatic-manual change-over circuit used in the circuit of FIG. 1.

FIG. 4 shows a specific example of the multiplexer circuits 9 and 10, automatic-manual change-over circuit 19, gate circuit 96 and detection circuit 94. In FIG. 4, reference numerals 66 through 75 designate transmission gates. The outputs of the arithmetic circuit 5 and the D/A converter circuit 13 are applied to the transmission gates 66 and 67, respectively. The outputs of the transmission gates 66 and 67 are connected together and to the expansion time determination circuit 15. The four bit outputs $A_C$, $B_C$, $C_C$ and $D_C$ of the counter 7 are applied to the transmission gates 68, 70, 72 and 74, respectively. The outputs $A_G$, $B_G$, $C_G$ and $D_G$ of the gate circuit 95 are applied to the transmission gates 69, 71, 73 and 75, respectively. The outputs of the transmission gates 68 and 69, the outputs of the transmission gates 70 and 71, the outputs of the transmission gates 72 and 73, and the outputs of the transmission gates 74 and 75 are connected together to provide the outputs A, B, C and D of the multiplexer circuit 10, respectively. A series circuit of a resistor 78 and a switch 79 forming the automatic-manual change-over circuit 19 is connected in parallel with the power source 45.

The detection circuit 94 is constituted by the terminal R, which is adapted to be connected to an electronic flash, and a buffer circuit 101. The output of the buffer circuit 101 and the output of the automatic-manual change-over circuit 19 are applied to an OR circuit 102 forming the gate circuit 96. The output of the OR circuit 102 is applied as a transmission gate control signal to the transmission gates 67, 69, 71, 73 and 75 and is further applied through inverters 76 and 77, as a transmission gate control signal, to the transmission gates 66, 68, 70, 72 and 74.

The operation of the circuitry in FIG. 4 will be described. In the case where the electronic flash has not been fully charged, the terminal R is not the logic level "0", and the switch 79 is turned on, "0" signals are applied to the multiplexer circuits 9 and 10 and the transmission gates 66, 68, 70, 72 and 74 are rendered conductive while the gates 67, 69, 71, 73 and 75 are rendered non-conductive. Therefore, the output voltage of the arithmetic circuit 5, described by the equation (11) above, is applied to the expansion time determination circuit 15 while the digital output signal from the counter 7 is applied to the D/A converter circuit 13. When, in contrast, the switch 79 is turned off, "1" signals are applied to the multiplexer circuits 9 and 10. In response thereto, an operation opposite to the above-described operation is carried out. The output digital signal of the manual exposure time setting circuit 8 is converted into analog data, described by the equation (4) above, which is applied to the expansion time determination circuit 15. As is apparent from the above description, the on position of the switch 79 corresponds to the automatic exposure time control mode and the off position thereof corresponds to the manual exposure time control mode.

When the flash has been charged up thereby raising the logical level of the terminal R to "1", the output of the detection circuit 96 is raised to "1" irrespective of the state of the switch 79 as a result of which the manual time exposure control mode is established as in the case where the flash has not been fully charged and the switch 79 is turned off.

Figure 5:
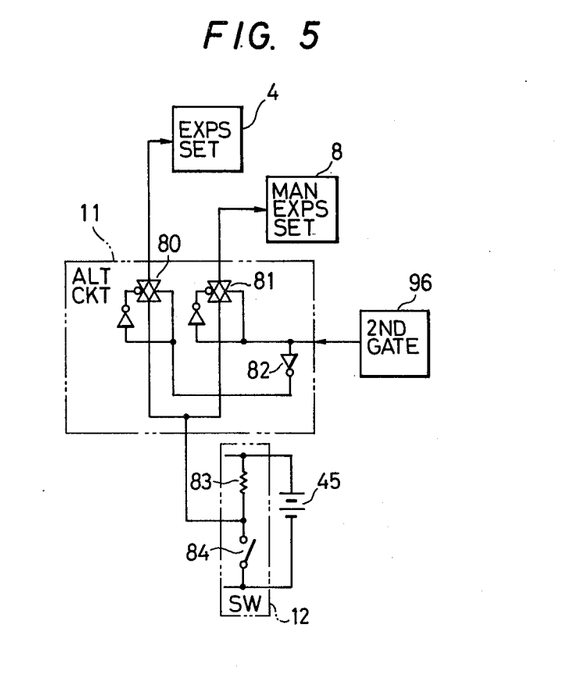
FIG. 5 is a circuit diagram, partly as a block diagram, showing specific examples of a multiplexer circuit and a switch circuit used in the circuit of FIG. 1.

FIG. 5 shows a specific example of the alternation circuit 11 and switch circuit 12. The inputs of transmission gates 80 and 81 are connected to the switch circuit 12 constituted by a resistor 83 and a switch 84 which are connected in series with the power source 45. The output of the gate circuit 96 is applied, as a transmission gate control signal, to the transmission gate 81 and through an inverter 82 to the transmission gate 80.

The operation of the circuitry in FIG. 5 will now be described. If the output of the gate circuit 96 is at "0" and the automatic exposure time control mode is selected, the transmission gate 80 is rendered conductive while the transmission gate 81 is rendered non-conductive. If, under this condition, the switch 84 is turned off, on and off in the stated order, then the switch circuit 12 applies a pulse signal "1"—"0"—"1" through the transmission gate 80 to the exposure factor setting circuit 4 which counts the pulse signal. Therefore, by suitably operating the switch 84 in this fashion, the exposure factor can be set to a desired value. The output of the exposure factor setting circuit 4 can be readily decoded and displayed if desired.

If the output of the gate circuit 96 is at "1" and the manual exposure time control mode is selected, the transmission gate 80 is rendered non-conductive while the transmission gate 81 is rendered conductive. Under this condition, opposite to the above-described case, the output signal of the switch 84 is counted by the manual exposure time setting circuit 8 and the manual exposure time is accordingly set. Therefore, the switch 84 serves as an exposure factor setting device in the case where the flash has not been fully charged and the switch 79 is in the "on" position. The switch 84 also serves as a manual exposure time setting device in the case where the flash has been fully charged or switch 79 is in the "off" position.

Figure 6:
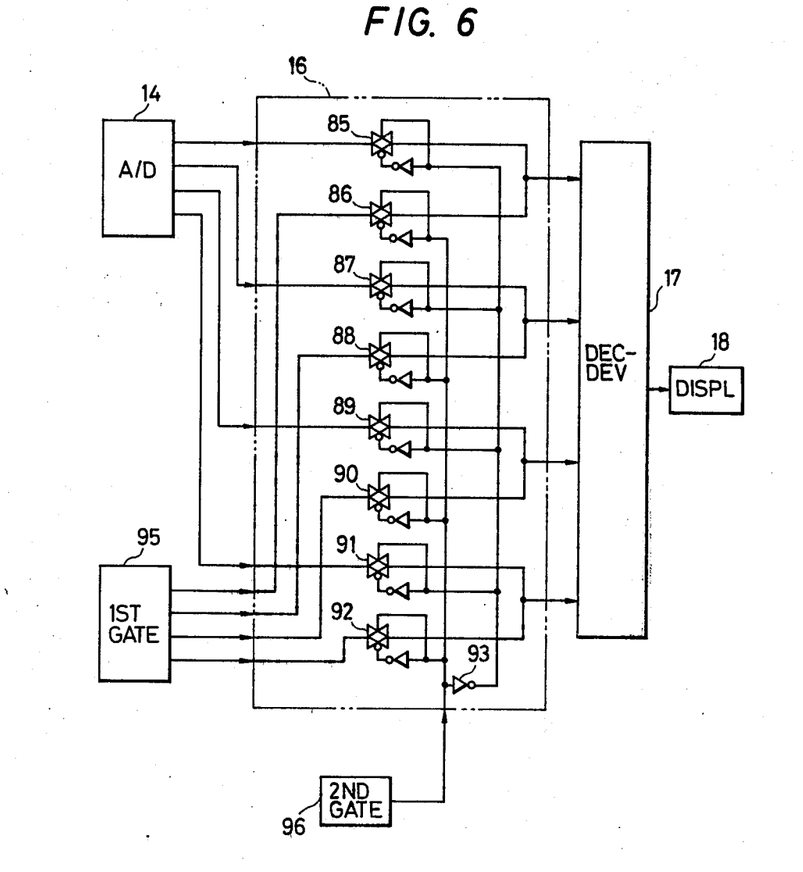
FIG. 6 is a circuit diagram, partly as a block diagram, showing a specific example of a multiplexer circuit used in the circuit of FIG. 1.

A specific example of the multiplexer circuit 16 is shown in FIG. 6 in which reference numerals 85 through 92 designate transmission gates. The outputs of the A/D converter and latch circuit are applied to corresponding ones of the transmission gates 85, 87, 89 and 91 and the outputs of the gate circuit 95 are applied to the transmission gates 86, 88, 90 and 92. The outputs of the transmission gates 85 and 86, the outputs of the transmission gates 87 and 88, the outputs of the transmission gates 89 and 90, and the outputs of the transmission gates 91 and 92 are connected together and are applied to the decoder and driver circuit 17. The output of the gate circuit 96 is applied, as a transmission gate control signal, to the transmission gates 86, 88, 90 and 92 and through an inverter 93 to the transmission gates 85, 87, 89 and 91.

The operation of the circuitry in FIG. 6 will be described. If the flash has not been mounted on the camera or the flash is mounted on the camera but it has not been fully charged, the switch 79 of the automatic-manual change-over circuit 19 is turned on to provide the automatic exposure time control operation. The output of the gate circuit 96 is set to "0" and therefore the transmission gates 85, 87, 89 and 91 are rendered conductive while the transmission gates 86, 88, 90 and 92 are rendered non-conductive. Thus, the output of the A/D converter and latch circuit 14 is applied to the decoder and driver circuit 17 and an exposure time for the automatic exposure time control mode is displayed by the display element unit 18.

In the case where, in contrast to the above-described situation, the switch 79 is turned off or the flash mounted on the camera has been fully charged, the output of the gate circuit 96 is raised to "1" and an operation opposite to the above-described operation is carried out. That is, the output of the manual exposure time setting circuit 8 is applied through the gate circuit 95 to the decoder and driver circuit 17 and an exposure time for the manual exposure time control mode is displayed by the display element unit 18.

With the exposure factor setting circuit 4 and the manual exposure time setting circuit 8 are provided in the form of an up-down counter, the exposure factor and the manual exposure time can be set using an up-down count system. Furthermore, if the manual exposure time setting circuit section is made up of elements such as C-MOS devices having a small current consumption and which are supplied with a voltage directly without using a power switch in a battery backup system, a selected manual exposure time set can be stored.

As is clear from the above description, with the exposure time control circuit according to the invention, not only are the automatic exposure time control and the manual exposure time control modes carried out but also the exposure time is set to the flash synchronization time simultaneously when the electronic flash is charged and ready for operation. A synchronization of the flash light operation and the exposure time is completely eliminated with the use of the invention.

What is claimed is:

1. An exposure time control circuit for a camera comprising:

arithmetic operation circuit means coupled to receive signals representing object brightness, film sensitivity, aperture value and exposure factor logarithmic compression values for calculating an automatic exposure time;

manual exposure time setting means for producing digital data corresponding to a manually set exposure time;

detecting means for detecting when an electronic flash is ready for operation, said detecting means providing a first signal when said electronic flash is ready and a second signal when said electronic flash is not ready;

an automatic-manual change-over means for switching between an automatic exposure time control mode and a manual exposure time control mode;

first gate means operatively coupled for subjecting an output of said manual exposure time setting means and an output of said detecting means to a logic operation, said first gate means passing the output of said manual exposure setting means in response to said second signal and providing at its output a preselected flash exposure time in response to said first signal;

second gate means operatively coupled for subjecting an output of said automatic-manual change-over means and an output of said detecting means to a logic operation, said second gate means passing the output of said automatic-manual change-over means in response to said second signal, and providing a manual exposure time control mode in response to said first signal;

digital-to-analog converter means for converting a digital output of said first gate means to an analog signal; and expansion time determination means for providing an exposure time determination in response to an output of one of said arithmetic means and said analog signal produced by said digital-to-analog converter means as determined by an output of said second gate means.

2. The exposure time control circuit of claim 1 further comprising brightness compression circuit means producing a signal representing object brightness coupled to said arithmetic operation circuit means; film sensitivity compression circuit means producing a signal representing film sensitivity coupled to said arithmetic operation circuit means; aperture value compression circuit means producing a signal representing aperture value coupled to said arithmetic operation circuit means; exposure factor setting circuit means producing a signal representing exposure factor coupled to said arithmetic operation circuit means.

3. The exposure time control circuit of claim 2 wherein said brightness compression circuit means comprises a first NPN transistor having a collector coupled to a positive terminal of a power source, an FET transistor having a source coupled to a base of said first NPN transistor and a drain coupled to said collector of said first NPN transistor, a photodiode having a cathode coupled to said base of said first NPN transistor and an anode coupled to a gate of said FET transistor, a logarithmic compression transistor having a collector coupled to said anode of said photodiode and an emitter coupled to a negative terminal of said power source, and a resistor coupled between said cathode of said photodiode and said negative terminal of said power source; wherein said film sensitivity compression circuit means comprises a variable resistor; wherein said aperture value compression circuit means comprises a variable resistor; wherein said exposure factor setting circuit means comprises a first constant current source having a first terminal coupled to said positive terminal of said power source, a second NPN transistor having a collector coupled to said first terminal of said first constant current source and a base coupled to a second terminal of said constant current source, third through fifth NPN transistors having emitter area ratios of 1:2:4 with bases of each of said third through fifth NPN transistors coupled together and to an emitter of said second NPN transistor and having a resistor coupled between respective emitters of said third through fifth NPN transistors and said negative terminal of said power source, a sixth NPN transistor having a collector coupled to said second terminal of said constant current source with a base of said sixth NPN transistor coupled to said emitter of said second NPN transistor and having a resistor coupled between the emitter of said sixth NPN transistor and said negative terminal of said power source, second through fourth FET transistors having drains commonly coupled to said positive terminal of said power source and each having a source coupled to a corresponding emitter of one of said third through fifth NPN transistors, a three-bit quinary counter having outputs coupled respectively to gates of said second through fourth FET transistors; and wherein said arithmetic operation circuit comprises second and third constant current sources having first terminals coupled to said negative terminal of said power source and second terminals coupled respectively to second terminal of said variable resistors first terminals of which are coupled to an emitter of said first NPN transistor, an operational amplifier coupled in a voltage-following mode having a non-inverting input terminal coupled to said second terminal of said variable resistor forming said aperture value compression circuit means, and a resistor coupling the output of said operational amplifier to said collectors of said third through fifth NPN transistors, the junction between said resistor and said collector of said third through fifth NPN transistors forming the output of said arithmetic operation circuit means.

4. The exposure time control circuit of claim 3 further comprising switch means and alternation circuit means operatively coupling an output of said switch means to a count input of said quinary counter.

5. The exposure time control circuit of claim 1 wherein said manual exposure time setting means comprises counter means.

6. The exposure time control circuit of claim 1 further comprising oscillator means, counter means for producing a binary count in response to pulses produced by said oscillator means, and first multiplexer means having outputs of said counter means coupled to a first input port thereof and outputs from said second gate means coupled to second input port means thereof and output port means of said first multiplexer means being coupled to an input port of said digital-to-analog converter means, said first multiplexer means operating in response to an output of said second gate means.

7. The exposure time control circuit of claim 6 wherein said automatic-manual change-over means comprises a switch and a resistor coupled in series with one another with the series combination of said resistor and said switch being coupled across a power source.

8. The exposure time control circuit of claim 7 wherein said second gate means comprises an OR gate having a first input thereof coupled to the junction between said switch and said resistor and having a second input coupled to an output of said detecting means.

9. The exposure time control circuit of claim 1 further comprising analog-to-digital converter means having analog inputs coupled to receive an output of said arithmetic operation circuit means and said digital-to-analog converter means, second multiplexer means having a first input port thereof coupled to an output port of said analog-to-digital converter and a second input port coupled to said output of said first gate means and said second multiplexer means operating in response to said output of said second gate means, displaying means operating in response to outputs of said second multiplexer means, third multiplexer means having inputs coupled to said output of said arithmetic operation circuit means and said digital-to-analog converter means in said third multiplexer means operating in response to said output of said second gate means, and expansion time determination circuit means operating in response to an output of said third multiplexer means.

* * * * *